United States Patent
Zank et al.

(10) Patent No.: US 10,693,721 B2
(45) Date of Patent: Jun. 23, 2020

(54) METHODS FOR SERIAL PORT CLIENT SERVER MAPPING

(71) Applicant: Topaz Systems, Inc., Moorpark, CA (US)

(72) Inventors: Anthony E. Zank, Westlake Village, CA (US); Christopher Priesz, Simi Valley, CA (US); Jeff Robertson, Simi Valley, CA (US)

(73) Assignee: Topaz Systems, Inc., Moorpark, CA (US)

( * ) Notice: Subject to any disclaimer, the term of this patent is extended or adjusted under 35 U.S.C. 154(b) by 0 days.

(21) Appl. No.: 15/858,793

(22) Filed: Dec. 29, 2017

(65) Prior Publication Data

US 2019/0207809 A1    Jul. 4, 2019

(51) Int. Cl.
*H04L 12/24* (2006.01)
*G06F 13/42* (2006.01)
*G06F 13/10* (2006.01)
*G06F 13/38* (2006.01)

(52) U.S. Cl.
CPC .......... *H04L 41/082* (2013.01); *G06F 13/102* (2013.01); *G06F 13/387* (2013.01); *G06F 13/4282* (2013.01)

(58) Field of Classification Search
CPC ... H04L 41/082; G06F 13/102; G06F 13/387; G06F 13/4282
See application file for complete search history.

(56) References Cited

U.S. PATENT DOCUMENTS

| | | | |
|---|---|---|---|
| 2005/0154787 A1* | 7/2005 | Cochran | G06F 9/4411 709/219 |
| 2005/0209842 A1* | 9/2005 | Klein | G06F 13/12 703/25 |
| 2014/0181891 A1* | 6/2014 | Von Bokern | H04L 63/20 726/1 |

OTHER PUBLICATIONS

"Remote Desktop Network Printer Redirection". Farmhouse Networking. Jul. 14, 2016. https://www.farmhousenetworking.com/networking/remote-access/remote-desktop-network-printer-redirection/.

* cited by examiner

*Primary Examiner* — Angela Nguyen
(74) *Attorney, Agent, or Firm* — Jeffrey G. Sheldon; Cislo & Thomas LLP

(57) ABSTRACT

A method for a server to assign a corn port to a peripheral device coupled to a client computer includes initiating a session in response to a request from a client, receiving from the client information identifying the peripheral device, calling on the server a driver for the identified peripheral device and assigning on the driver a fixed virtual port to the identified peripheral device; assigning on the server a virtual corn port in server space for the identified peripheral device, automatically specifying on the server the virtual corn port as the connection for the identified peripheral device, and mapping on the server a variable corn port to the peripheral device in server space.

7 Claims, 3 Drawing Sheets

METHODS FOR SERIAL PORT CLIENT SERVER MAPPING

BACKGROUND

The present invention relates to computer systems and networks. More particularly, the present invention relates to networks including multiple client computers connected to peripheral devices and to apparatus and methods for mapping serial ports for such peripheral devices connected to client computers.

It has become popular in recent years, for businesses to configure a client/server computing model that places complete control of what a client computer is allowed to do under the central control of a server being managed by an IT management department. Businesses that need this type of service include financial services, healthcare and many others, where computer terminals are used by a variety of people during the day, and where it is critical that confidential information not be available or stored on a remote client computer but kept locked down on, and under the sole control of a central server system. Vendors providing this type of client/server software include Microsoft, Citrix, VMware and others. The essence of these systems is that all programs are only resident on, and run on, the server but do so by interacting with a client over a network connection. In many cases, these clients are thin clients that contain no non-volatile data storage or operating system.

In the design and management of remote client computing, allocation of bandwidth is a key consideration, because the software is not being run all within a single PC with a high-speed hardware data bus. Rather, the software is run on the server using data input by the client and received over the network connection by the server and presenting data over the network connection to the client. In some cases, such as a large hospital, there may be thousands of these clients, located in various locations on the hospital campus or at one or more remote physical sites. It is important to prioritize and allocate base connection bandwidth carefully, first being allocation to display of information on the client, and then to client user interaction such as keyboard, mouse, and other device input, and the printout of paper documents that can be provided to the customer/client.

Data that may be required from remotely-located peripheral devices such as scanned images, captured signatures, video and/or sound can take up a lot of bandwidth yet are outside of the direct control of the server, as to the timing and amount of data flowing between client and server. For this reason, peripheral-device ports are allocated sparingly and via special procedures in such systems. In addition, because these client-connected peripheral device ports, such as com ports for example, may be only intermittently connected to the server, it can become a difficult task to assure that the mapping of a peripheral device attached to a client is allocated correctly to a port on the server, and is clearly associated with and made available correctly to an application program in use by a particular client, and not to any other client.

Current solutions involve static mapping of ports or peripherals on a client device to corresponding port or port assignments on the server computer, or multiple server computers operating together. However, in a dynamic environment with hundreds or thousands of such clients and peripheral devices, and individual users constantly logging in and out with different credentials and permissions, static mapping can fail to accurately connect the peripheral device or port to the corresponding application program on the server dedicated to the client and user of interest.

BRIEF DESCRIPTION

A hardware and software system, consisting of a server, a computing client, separate or integrated peripherals requiring port access, software to control the client login and session. The system configured to properly direct the connection of the peripherals to the server session, in accordance with the present invention.

The user logs into a remote session in which a USB peripheral device attached to the client is USB re-directed by VID/PID identifiers to the session where a variable COM port is assigned to the device in server-space on the server.

The re-directed USB device is first afforded a fixed virtual COM port by virtue of the drivers installed for the USB device on the server. The user login also initiates a login script, or the use of an application program designed to access the remote peripheral devices or ports, which triggers a software utility on the server that determines the virtual COM port that the particular peripheral USB device for that user is assigned specifically on the server in server space. The COM port specific to the user's USB device at this time is in this manner discovered on-the-fly.

The utility then automatically writes the discovered virtual COM port assignment on the server to a file dedicated to details specifying the connection of that signature capture device for that particular user without user intervention. Alternately, the port can be set dynamically in the calling application as a return value so that the port does not have to be written to a file; but implemented in the software application on the fly. This latter option does require further custom software development.

The user proceeds to use the application software residing on the server accessed via the remote client, including peripheral device software if so needed, where the peripheral device is connected physically to the remote client.

When accessed by the application software, the peripheral device software running in the server looks to the mapping information provided above in order to properly activate the correct device on the remote client as needed.

According to one aspect of the present invention, a method for a server to assign a com port to a peripheral device coupled to a client computer includes initiating a session in response to a request from a client, receiving from the client information identifying the peripheral device, calling on the server a driver for the identified peripheral device and assigning on the driver a fixed virtual port to the identified peripheral device; assigning on the server a virtual com port in server space for the identified peripheral device, automatically specifying on the server the virtual com port as the connection for the identified peripheral device, and mapping on the server a variable com port to the peripheral device in server space.

According to another aspect of the invention, the method includes running application software on the server in response to a request from the client to run the application software, and when communication with the identified peripheral device is accessed by the application software, using the mapped variable com port to communicate with the identified peripheral device.

BRIEF DESCRIPTION OF THE DRAWING FIGURES

The invention will be explained in more detail in the following with reference to embodiments and to the drawing in which are shown:

DETAILED DESCRIPTION

In the following description, numerous specific details are set forth in order to provide a more thorough description of the present invention. It will be apparent, however, to one skilled in the art, that the present invention may be practiced without these specific details. Other embodiments of the invention will readily suggest themselves to such skilled persons having the benefit of this disclosure. In some instances, well-known features have not been described in detail so as not to obscure the invention.

Figure 1:
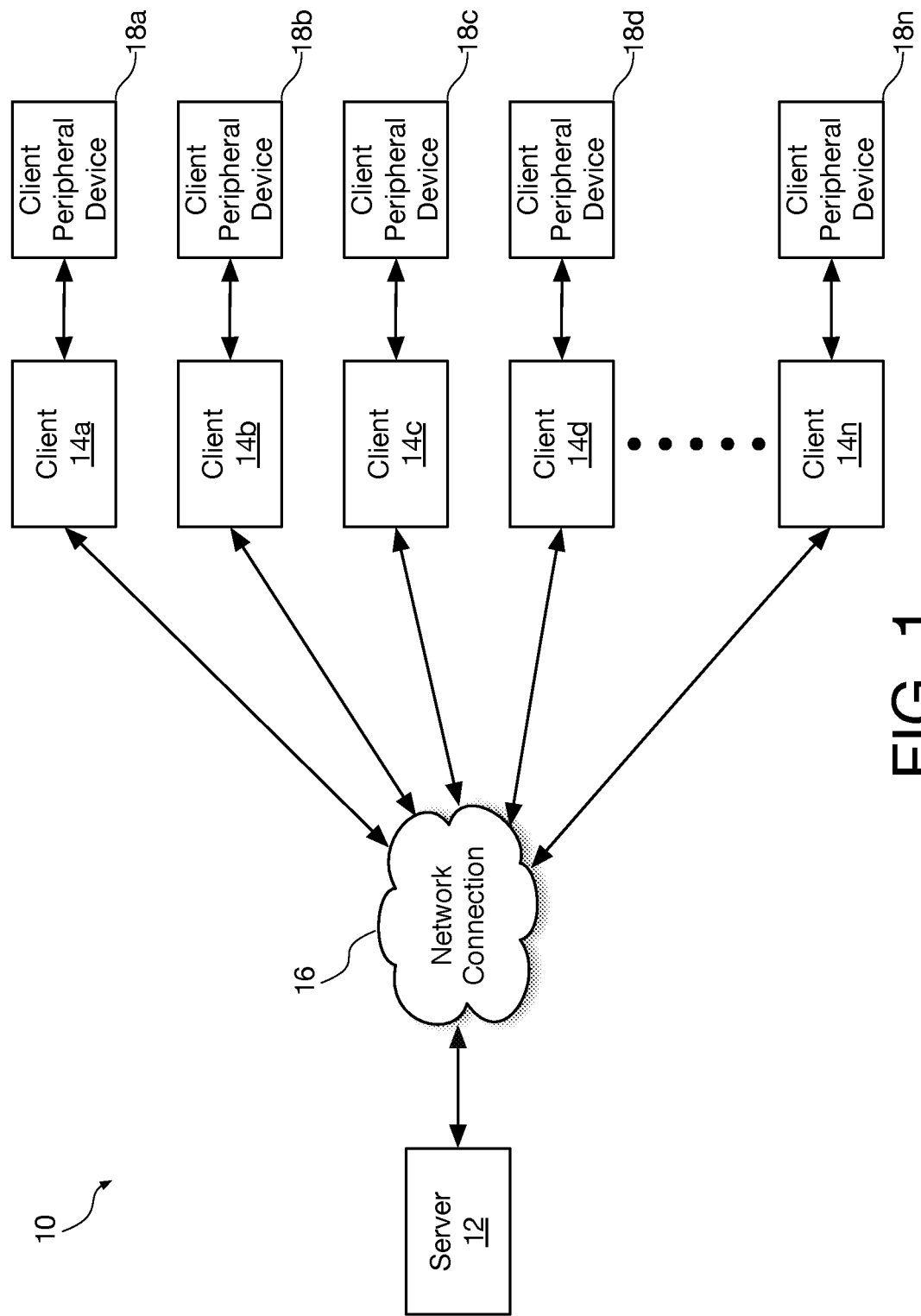
FIG. 1 is a block diagram of a typical server/multi-client network environment in which the present invention may be employed.

Referring first of all to FIG. 1 a block diagram shows a typical server/multi-client network environment 10 in which the present invention may be employed. Network environment 10 includes a server 12, which may be a computer configured to be a client server. In the illustrative embodiment shown in FIG. 1, server 10 may accept connections from a plurality of client computers designated 14a through 14n over a network 16. Client computers 14a through 14n may run any operating system, such as the Microsoft Windows operating system, or other operating system and are configured as thin clients, which means that the application software that each of client computers 14a through 14n runs is resident on the server 12 and receives input such as keystrokes from a keyboard not shown) associated with each client computer 14a through 14n and sends output such as computer display content to 14a through 14n to a display associated with each client computer 14a through 14n.

Each client computer 14a through 14n may be connected to a client peripheral device, such as, but not limited to, a signature capture pad. Client peripheral devices 18a through 18n require port access to computers 14a through 14n, respectively, and are shown coupled, respectively, to client computers 14a through 14n using a connection that implements the well-known USB protocol. As will be understood by persons of ordinary skill in the art, the peripheral devices 18a through 18n may be separate or may be integrated with the computers 14a through 14n, respectively. They are shown separately for convenience.

Figure 2:
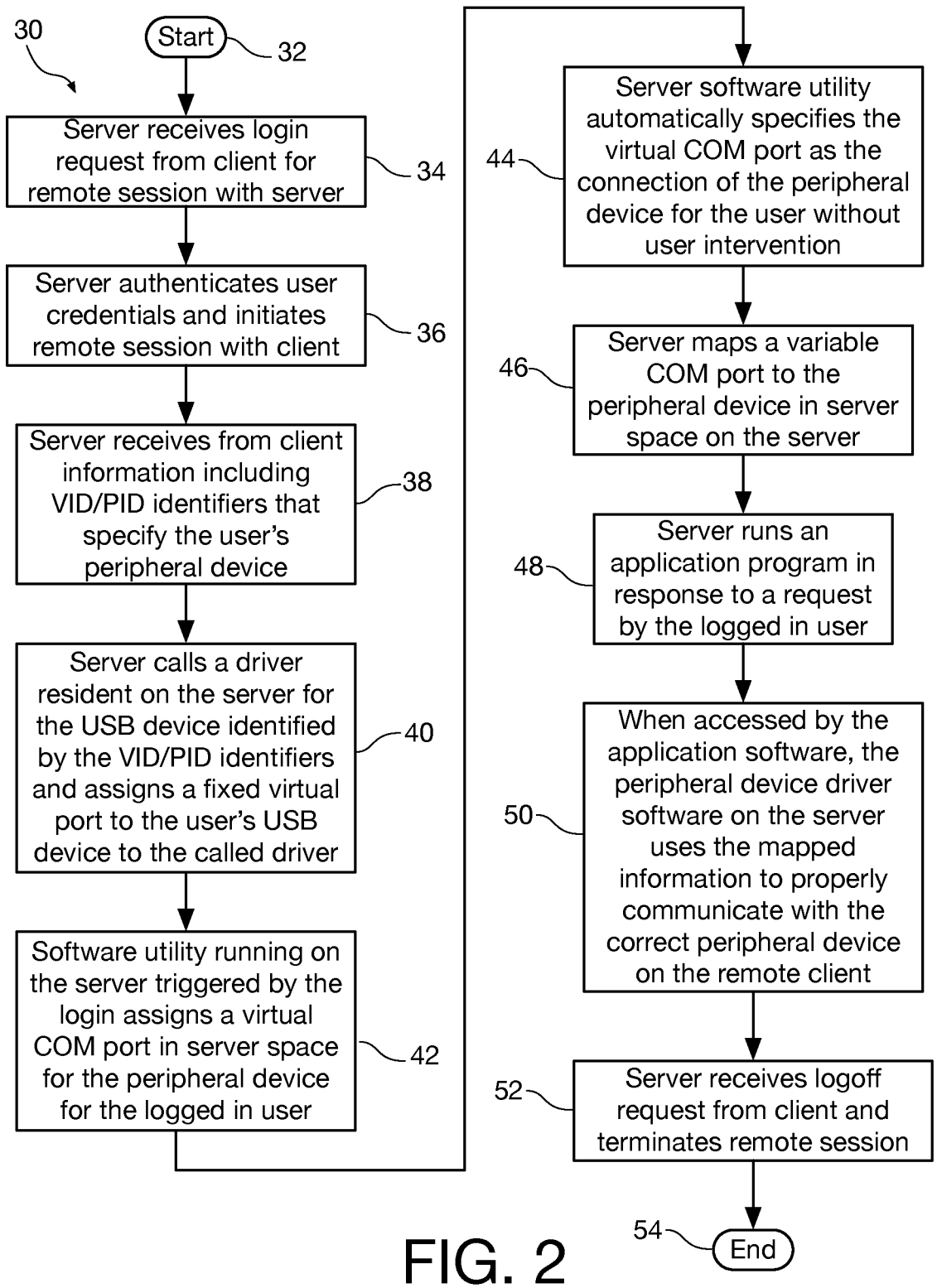
FIG. 2 is a flow diagram illustrating an aspect of the present invention from the perspective of the server.

Referring now to FIG. 2, a flow diagram illustrates method 30 performed by the server 10 according to an aspect of the present invention. The server 12 runs software to control the client login and session. The system 10 is configured to properly direct the connection of the peripherals to the server session. The method begins at reference numeral 32.

At reference numeral 34, the server receives a login request from a client for a remote session with the server. At reference numeral 36 the server authenticates the user and initiates a remote session with the client computer. As well understood by persons of ordinary skill in the art, the authentication procedure may follow any one of numerous available protocols, and may include username and password protected access as is known in the art.

At reference numeral 38, the Server receives from the client information including VID/PID identifiers that specify the user's peripheral device. In addition to the VID/PID information, the server may receive other information such as, but not limited to a serial number of the peripheral device, information identifying a firmware and/or software revision running in the peripheral device, and other information that would be useful for the server to have in order to manage and or control the remote session with respect to the peripheral device.

At reference numeral 40, the server calls a driver resident on the server that is appropriate for the USB device identified by the VID/PID identifiers and assigns a fixed virtual port to the user's USB device to the called driver. At reference numeral 42, a software utility running on the server that is triggered by the login assigns a virtual COM port in server space for the peripheral device for the logged in user. This can be a script or application initiated in one of several available ways including but not limited to the login, initiation by the calling application, or a function performed by the calling application to connect to the peripheral device.

At reference numeral 44, the server software utility automatically specifies the virtual COM port as the connection of the peripheral device for the user without need for user intervention. As will be appreciated by persons of ordinary skill in the art, the software utility can automatically provide the discovered COM port assignment to the computer system or application specifying the connection of the peripheral device via mechanisms such as a return value, or by writing to a file or other memory device or return value system.

At reference numeral 46, the server maps a variable COM port to the peripheral device in server space on the server. At reference numeral 48, the server runs an application program in response to a request by the logged in user.

At reference numeral 50, when accessed by the application software running on the server, the peripheral device driver software on the server uses the mapped information to properly communicate with the correct peripheral device on the remote client. The communication can provide data from the peripheral device to the application software running on the server or provide data from the application software running on the server to the peripheral device.

At reference numeral 52, the server receives a logoff request from the client and terminates the remote session. The method ends at reference numeral 54.

Figure 3:
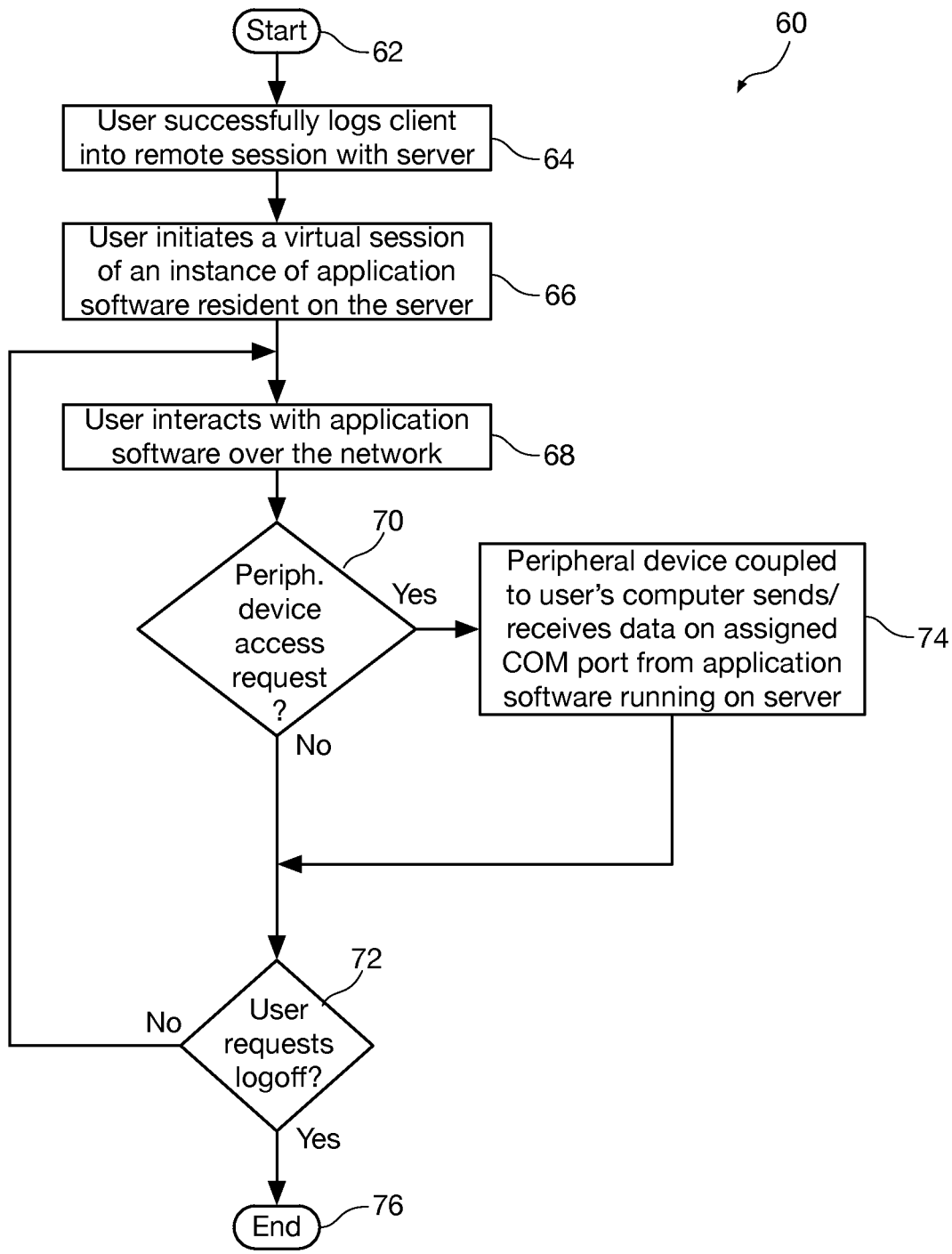
FIG. 3 is a flow diagram illustrating an aspect of the present invention from the perspective of the client computer.

Referring now to FIG. 3, a flow diagram shows an illustrative method 60 performed by the client computer in accordance with an aspect of the present invention. The method begins at reference numeral 62.

At reference numeral 64, the user successfully logs client into a remote session with the server. At reference numeral 66, the user initiates a virtual session of an instance of an application software resident on the server. At reference numeral 68, the user interacts with the application software over the network. The method then loops through reference numerals 70 and 72 as long as the user does not request the application software to access the peripheral device and remains logged in to the server.

If at reference numeral 70 the user requests the application software to access the peripheral device coupled to the user's computer in order to send data to the application software or receive data from the application software, the peripheral device coupled to user's computer then at reference numeral 74 sends data to the application software or receives data from the server application software in accordance with the request on assigned COM port.

The user proceeds to use the application software residing on the server accessed via the remote client computer until the user makes a logoff request at reference numeral 76 in response to which the remote session is terminated. The method ends at reference numeral 76.

Although the above provides a full and complete disclosure of the preferred embodiments of the invention, various modifications, alternate constructions and equivalents will occur to those skilled in the art. Therefore, the above should not be construed as limiting the invention, which is defined by the claims.

What is claimed is:

1. A method for a server to assign a com port to a peripheral device coupled to a client computer comprising;
   initiating a session in response to a request from a client;
   receiving from the client information identifying the peripheral device;
   calling on the server a driver for the identified peripheral device and assigning on the driver a fixed virtual port to the identified peripheral device;
   assigning on the server a virtual com port in server space for the identified peripheral device;
   automatically specifying on the server the virtual com port as the connection for the identified peripheral device; and
   mapping on the server a variable com port to the peripheral device in server space.

2. The method of claim 1 further comprising:
   running application software on the server in response to a request from the client to run the application software; and
   when communication with the identified peripheral device is accessed by the application software, using the mapped variable com port to communicate with the identified peripheral device.

3. The method of claim 1 wherein receiving from the client information identifying the peripheral device comprises receiving from the client VID/PID information identifying the peripheral device.

4. The method of claim 3 wherein receiving from the client information identifying the peripheral device comprises receiving from the client a serial number of the peripheral device.

5. The method of claim 3 wherein receiving from the client information identifying the peripheral device comprises receiving from the client information identifying a firmware and/or software revision running in the peripheral device.

6. The method of claim 2 wherein assigning a virtual COM port in server space for the peripheral device for a logged in user is performed by running one of a script and an application initiated in one of several available ways including but not limited to initiating the session in response to a request from the client for a login, initiation by running the application software, and performing a function by the application software to connect to the peripheral device.

7. The method of claim 1 wherein automatically specifying on the server the virtual com port as the connection for the identified peripheral device comprises automatically specifying on the server the virtual com port as the connection for the identified peripheral device as one of setting the port can dynamically in the application software as a return value, writing data specifying the com port to one of a file, a memory device other than a file, or return value system.

* * * * *